United States Patent
Chang et al.

(10) Patent No.: US 6,398,418 B1
(45) Date of Patent: Jun. 4, 2002

(54) SHAFT HAVING THERMAL EXPANSION, THERMAL PRE-LOAD YIELDING AND DYNAMIC PRE-LOAD ADJUSTING SYSTEMS

(75) Inventors: Tsann-Huei Chang, Hsinchu; Jih-Jong Hsu, Taichung; Shang-Liang Chen, Tainan, all of (TW)

(73) Assignee: Industrial Technology Research Institute, Hsinghu (TW)

( * ) Notice: Subject to any disclaimer, the term of this patent is extended or adjusted under 35 U.S.C. 154(b) by 53 days.

(21) Appl. No.: 09/715,145

(22) Filed: Nov. 20, 2000

(51) Int. Cl.[7] .............................................. F16C 37/00
(52) U.S. Cl. ...................... 384/493; 384/905
(58) Field of Search ................ 384/493, 557, 384/905

(56) References Cited

U.S. PATENT DOCUMENTS 3,326,613 A * 6/1967 Renker .................. 384/493
3,561,829 A * 2/1971 Heldt ...................... 384/557
6,135,641 A * 10/2000 Smith ...................... 384/493
6,158,895 A * 12/2000 Date ........................ 384/493

FOREIGN PATENT DOCUMENTS

JP 405079514 * 3/1993

* cited by examiner

Primary Examiner—Thomas R. Hannon
(74) Attorney, Agent, or Firm—Bacon & Thomas, PLLC

(57) ABSTRACT

A shaft having thermal expansion, thermal pre-load yielding and dynamic pre-load adjusting systems. The shaft is made by the zero expansion or very low expansion materials. The shaft has two bearing assemblies. Each bearing assembly has two parallel bearings. A partition ring set is disposed between them. The partition ring set is made of multiple low and negative thermal expansion materials. It includes an inner partition ring and an outer partition ring. The inner partition ring is tightly contacting with corresponding sides of inner annular seats of the bearing. The outer partition ring is disposed outside of the inner partition ring without any contact. And, the outer partition ring is tightly contacting with corresponding sides of outer annular seats of the bearings.

2 Claims, 3 Drawing Sheets

SHAFT HAVING THERMAL EXPANSION, THERMAL PRE-LOAD YIELDING AND DYNAMIC PRE-LOAD ADJUSTING SYSTEMS

BACKGROUND OF INVENTION

1. Field of the Invention

This invention is related to a shaft having thermal expansion, thermal pre-load yielding and dynamic pre-load adjusting systems. Particularly, its central shaft will not expand when the temperature arises. It has a partition ring set to yield thermal pre-load. And, it contains a dynamic pre-load adjusting system.

2. Description of the Prior Art

The requirements of manufacturing precision and cutting tool's rotation speed are higher than before. The major frictions are created from the interface between the shaft and the motor and interface between the shaft and the rotated working object (the bearing is heated due to of pre-load). Under a high speed rotation, the thermal expansion by the bearing and the thermal expansion by the partition ring set are different. In addition, because of their arrangement, they always push each other. Thus, a thermal stress is occurred. Consequently, the frictional force will increase. And, the heat is generated accordingly. Under such thermal expansion effect, the axis of the shaft might be tiled and the protruded length of the shaft could be slightly changed, so that there are some swinging error and protrusion error. As a result, the manufacturing precision is lowered, and the bearing is over-heated. Thus, it will not work properly.

In order to solve the above-mentioned problems, there are some conventional method listed below. However, their disadvantages also can be seen as follows.

1. Shaft with water jacket cooling system:

This is to install a water jacket system around the main shaft as a cooling system. It only can cool the outer surface of the main shaft. It cannot cool down the central shaft portion of the main shaft. However, its cooling efficiency is low. In addition, a cooler or cooling equipment must be used. Therefore, its cost is high, its water temperature cannot be precisely controlled, and the circulated water is hard to be post-processed.

2. Injecting coolant or high pressure air to the central shaft portion:

Because the space around the central shaft inside the main shaft is limited, it is highly difficult to design or install the pipe system for injecting coolant or air. Furthermore, because the central shaft's rotation speed is very high, the corresponding cooling ability must be very high. For example, it can be enhanced by a compressor or a pump.

3. Variable pre-load mechanism:

By using a hydraulic cylinder, a spring, or piezo-electric element, it can dynamically adjust the applied forces on the inner and outer seat rings of the bearing. However, when the temperature arises, the uncertain factors of thermal expansion and rigidity still exists. Moreover, it might cause oil leakage or poor manufacturing precision, so its reliability is not good.

4. Lubrication:

This is to add some grease, oil-gas mixture or lubricant in the bearings. Although it can reduce the temperature, the reduced range is still quite limited. Particularly, under the high-speed rotation, the lubrication still will cause some serious pollution problem that needs to be solved.

SUMMARY OF THE INVENTION

The primary object of the present invention is to provide a shaft having thermal expansion, thermal pre-load yielding and dynamic pre-load adjusting systems. By means of using the central shaft that is made by the zero expansion or very low expansion materials, when the temperature increases, the central shaft will have no thermal expansion effect so as to keep a very high precision.

The next object of the present invention is to provide a shaft having thermal expansion, thermal pre-load yielding and dynamic pre-load adjusting systems. In which, the partition ring set is made of multiple alloys with low and negative thermal expansion coefficients. When the temperature of the partition ring set increases, it reduces the clamping forces between the inner and the outer annular seats of the bearings. Therefore, the frictional force is minimized and the range of increased temperature is limited. By using such the combination of low and negative expansion materials, this invention can automatically achieve the dynamic pre-load adjusting function. So, it will prolong the life of the central shaft and bearings.

DETAILED DESCRIPTION OF THE PREFERRED EMBODIMENT

Figure 1:
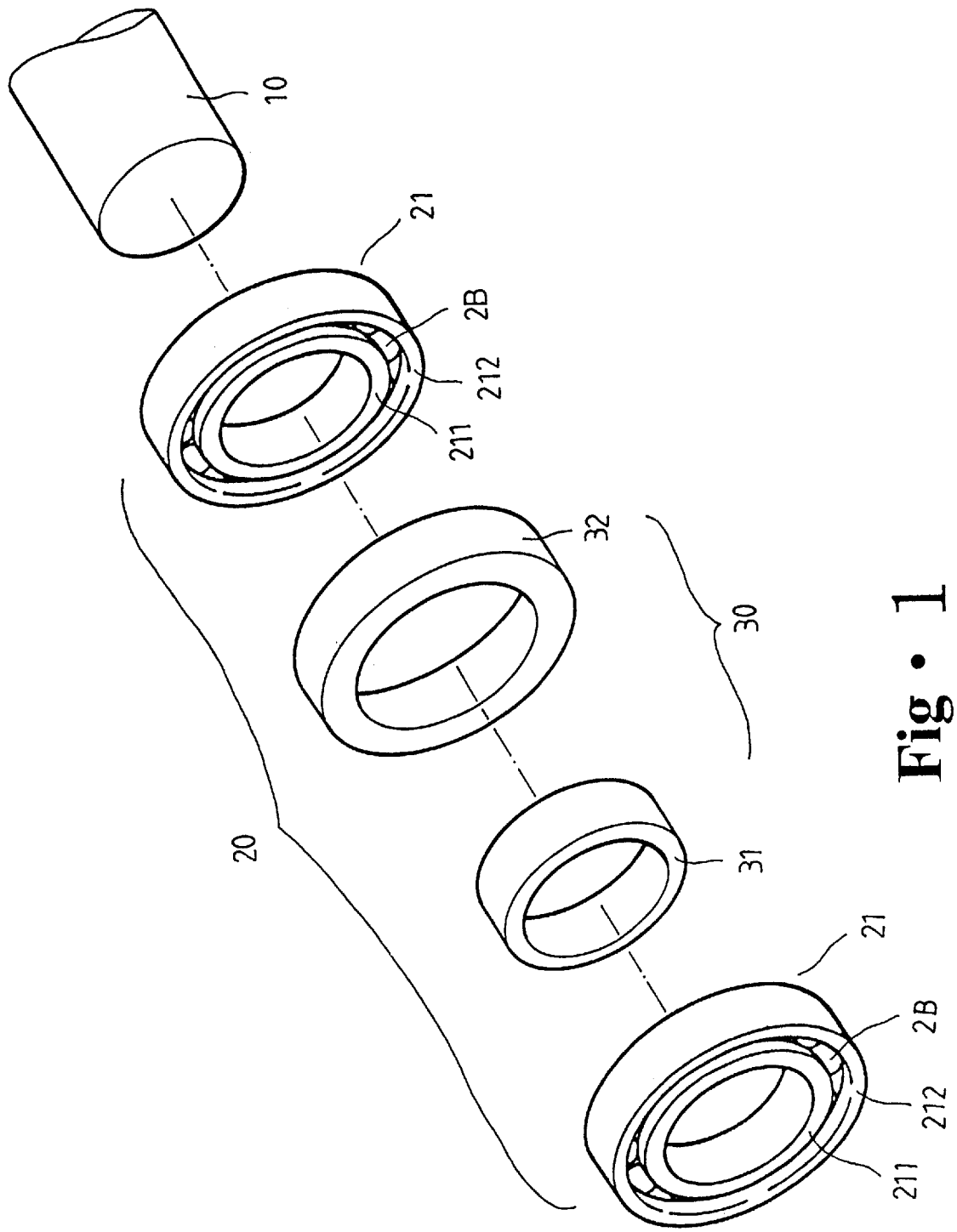
FIG. 1 is an explored view of the present invention.

Referring to FIG. 1, the present invention comprises a shaft. The shaft having a central shaft 10 which is made by a material with a zero or very low thermal expansion coefficient such as Invar, Super Invar or Zerodur. The central shaft 10 has two ends. One end of the said central shaft 10 is fixed with a cutting tool (not shown), and the other end of said central shaft 10 is engaged with a power source (not shown).

Each end of the central shaft 10 is disposed with a bearing assembly 20. Each bearing assembly 20 has two parallel bearings 21. Each of the bearings 21 includes an inner annular seat 211 and an outer annular seat 212. A plurality of balls 213 is set between the inner annular seat 211 and the outer annular seat 212. The inner annular seats 211 are fitted on the central shaft 10. The outer annular seats 212 are disposed in a main housing 40. A partition ring set 30 is disposed between these two parallel bearings 21. The partition ring set 30 includes an inner partition ring 31 and an outer partition ring 32. The inner and outer partition rings 31, 32 are made of multiple alloys with low and negative thermal expansion coefficients (for example, Ni—Fe alloy). The inner partition ring 31 is fitted on the central shaft 10. Two sides of the inner partition ring 31 are tightly contacting with corresponding sides of the inner annular seats 211 of the bearings 21. Also, the outer partition ring 32 is disposed outside of the inner partition ring 31 without any contact. Two sides of the outer partition ring 32 are tightly contacting with corresponding sides of the outer annular seats 212 of the bearings 21. And, the outer partition ring 40 is disposed inside said main housing 40.

Figure 2:
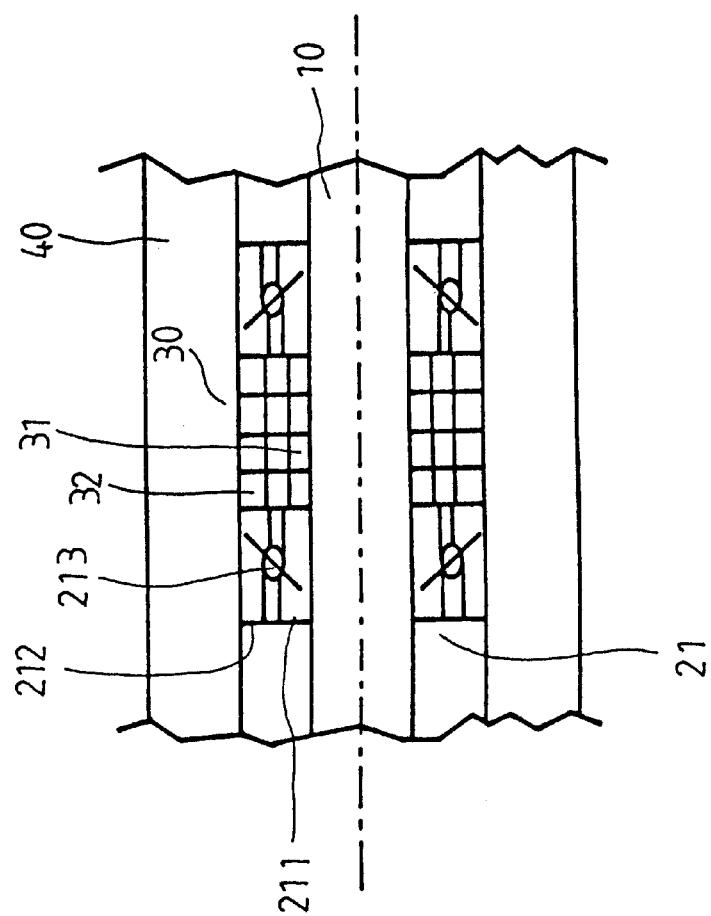
FIG. 2 is an assembled cross-sectional view of the present invention.
Figure 3:
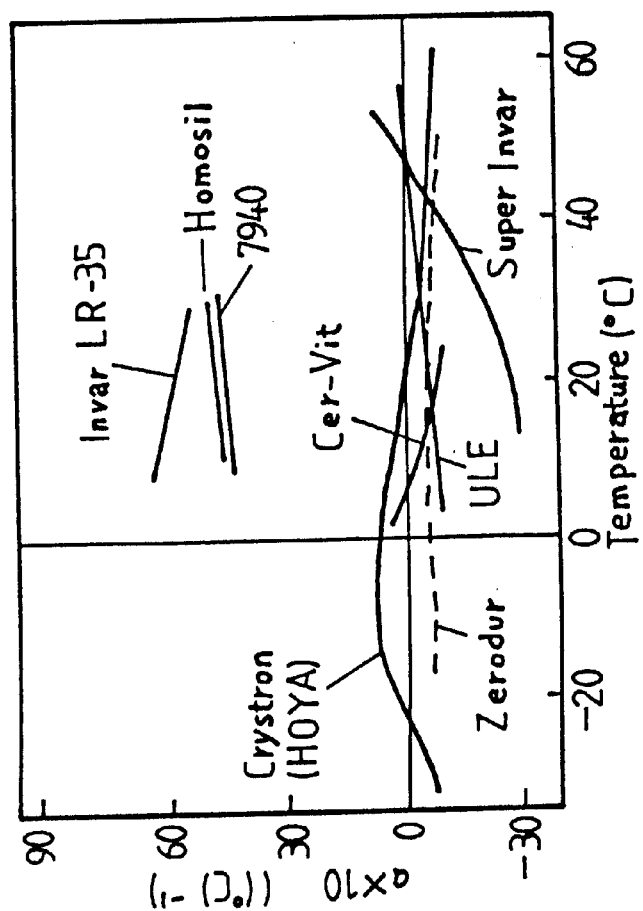
FIG. 3 is a diagram for illustrating the present invention with the zero-expansion, very low expansion and negative expansion materials.

Please refer to FIG. 2. Because the central shaft 10 is made by a material with a zero or very low thermal expansion coefficient such as Invar, Super Invar (Ni—Fe alloy) or Zerodur (ceramic material)(their material characteristics are shown in FIG. 3) and the space around the central shaft 10 is small, the heat will not be easy to transfer out. By using this kind of zero or very low expansion material, it will significantly reduce the cutting tool's swinging or protrusion errors caused by the thermal expansion effect. Therefore, the present invention will achieve the function of no thermal expansion while the temperature is changing.

In addition, the inner and outer partition rings 31, 32 are made of multiple alloys with low and negative thermal expansion coefficients. Under different temperatures, the inner and outer partition rings 31, 32 will keep in a pre-determined range of size. Thus, it creates a thermal pre-load effect for reducing the thermal expansion. Therefore, the present invention has the function of thermal pre-load yielding.

Moreover, these two bearings 21 adjacent to the partition ring set 30 are the single row angled bearings. The inner annular seats 211 and the outer annular seats 212 hold (or clamp) the balls 213 by opposite 45 degrees, respectively. When the temperature arises, the thermal expansion or negative expansion will be different. Therefore, the forces against the inner annular seat 211 and the outer annular seat 212 will be different, accordingly. For example, the contact condition between the inner partition ring 31 and the inner annular seat 211 becomes loose. So, the thermal expansion effect of the inner annular seat 211 is created. The outer partition ring 32 still can roughly limit the thermal expansion effect of the inner annular seat 211. So, due to the thermal expansion effect, the balls will not be tightly clamped by the inner annular seat 211 and the outer annular seat 212. Then, it will reduce the axial resisting force and the radial resisting force. Consequently, it will reduce the frictional force and the high temperature caused by high speed rotation. Therefore, it will prolong the life of the central shaft 10 and the bearings 20 and also achieve the function of dynamic pre-load adjusting.

Thus, by means of using the central shaft 10 and the bearings 20 that are made by the zero expansion, very low expansion and negative expansion materials, when the temperature increases, the central shaft 10 will keep a very high precision. In addition, when the temperature of the partition ring set 30 increases, it reduces the clamping forces between the inner and the outer annular seats 211, 212 of the bearings 21. Therefore, the frictional force is minimized and the range of increased temperature is limited. So, it will prolong the life of the central shaft 10 and bearings 20.

The above embodiments are only used to illustrate the present invention, not intended to limit the scope thereof. Many modifications of the above embodiments can be made without departing from the spirit of the present invention.

What is claimed is:

1. A shaft having thermal expansion, thermal pre-load yielding and dynamic pre-load adjusting systems, said shaft being made by a material with a zero or very low thermal expansion coefficient, said shaft comprising:

a central shaft, said central shaft having two ends, each end being disposed with a bearing assembly, said bearing assembly having two parallel bearings, each of the bearings including an inner annular seat and an outer annular seat, a plurality of balls being set between said inner annular seat and said outer annular seat, said inner annular seat being fitted on said central shaft, said outer annular seat being disposed in a main housing, a partition ring set being disposed between said two parallel bearings, said partition ring set including an inner partition ring and an outer partition ring, said inner and outer partition rings being made of multiple alloys with low and negative thermal expansion coefficients, said inner partition ring being fitted on said central shaft, two sides of said inner partition ring being tightly contacting with corresponding sides of said inner annular seats of the bearings, said outer partition ring being disposed outside of said inner partition ring without any contact, two sides of said outer partition ring being tightly contacting with corresponding sides of said outer annular seats of the bearings, and said outer partition ring being disposed inside said main housing.

2. A shaft having thermal expansion, thermal pre-load yielding and dynamic pre-load adjusting systems as claimed in claim 1, wherein one end of said central shaft is fixed with a cutting tool, and the other end of said central shaft is engaged with a power source.

\* \* \* \* \*